United States Patent
Matsusue

(10) Patent No.: US 11,108,066 B2
(45) Date of Patent: Aug. 31, 2021

(54) FUEL CELL SYSTEM

(71) Applicant: TOYOTA JIDOSHA KABUSHIKI KAISHA, Toyota (JP)

(72) Inventor: Masaaki Matsusue, Mishima (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 9 days.

(21) Appl. No.: 16/809,666

(22) Filed: Mar. 5, 2020

(65) Prior Publication Data

US 2020/0287227 A1  Sep. 10, 2020

(30) Foreign Application Priority Data

Mar. 8, 2019 (JP) .............................. JP2019-043146

(51) Int. Cl.

| | | |
|---|---|---|
| *H01M 8/04746* | (2016.01) | |
| *H01M 8/04082* | (2016.01) | |
| *H01M 8/2457* | (2016.01) | |
| *H01M 8/04014* | (2016.01) | |
| *H01M 8/04089* | (2016.01) | |

(52) U.S. Cl.
CPC ... *H01M 8/04753* (2013.01); *H01M 8/04014* (2013.01); *H01M 8/04089* (2013.01); *H01M 8/04201* (2013.01); *H01M 8/2457* (2016.02)

(58) Field of Classification Search
CPC ......... H01M 8/04753; H01M 8/04201; H01M 8/2457; H01M 8/04014; H01M 8/04089; H01M 8/1007; H01M 8/04253; H01M 8/04037; H01M 8/04097; H01M 8/04074
See application file for complete search history.

(56) References Cited

U.S. PATENT DOCUMENTS

| | | | |
|---|---|---|---|
| 6,306,532 B1* | 10/2001 | Kurita ............... | H01M 8/04089 429/413 |
| 2016/0118675 A1* | 4/2016 | Jung .................. | H01M 8/2485 429/415 |
| 2016/0204454 A1* | 7/2016 | Hakala ............... | H01M 8/0618 429/415 |

FOREIGN PATENT DOCUMENTS

| | | |
|---|---|---|
| JP | 2010-049914 | 3/2010 |
| JP | 2014-123457 | 7/2014 |
| WO | WO 2005/029627 | 3/2005 |

* cited by examiner

*Primary Examiner* — Stewart A Fraser
(74) *Attorney, Agent, or Firm* — Finnegan, Henderson, Farabow, Garrett & Dunner, LLP

(57) ABSTRACT

A fuel cell system includes a fuel cell that generates power due to a chemical reaction between fuel gas and oxidant gas, and an ejector that includes a first nozzle and a second nozzle having injection ports with different diameters, respectively, the injection ports injecting the fuel gas. The ejector introduces off gas recirculated from the fuel cell to the fuel cell together with the fuel gas. The fuel cell system also includes a heating unit that heats the ejector. The diameter of the injection port of the second nozzle is smaller than that of the first nozzle, and the heating unit is arranged on the side of the second nozzle of the ejector out of the first nozzle and the second nozzle.

9 Claims, 12 Drawing Sheets

FUEL CELL SYSTEM

INCORPORATION BY REFERENCE

The disclosure of Japanese Patent Application No. 2019-043146 filed on Mar. 8, 2019 including the specification, drawings and abstract is incorporated herein by reference in its entirety.

BACKGROUND

1. Technical Field

The disclosure relates to a fuel cell system.

2. Description of Related Art

There is a fuel cell system that includes an ejector that introduces fuel gas to a fuel cell stack together with off gas that is recirculated from the fuel cell stack. The ejector is provided with a nozzle that injects the fuel gas. For example, WO 2005029627 describes a multi jet ejector assembly that supplies an inlet stream to a fuel cell stack from a nozzle out of two nozzles in accordance to a load state.

SUMMARY

The off gas contains moisture generated due to power generation inside the fuel cell stack. Therefore, for example, in a subfreezing environment, the moisture contained in the off gas that is retained in the ejector may be frozen and thus block a flow of the fuel gas and the off gas. For example, in the ejector provided with the plurality of nozzles as described in WO 2005029627, when diameters of the nozzles are different from each other, it is especially likely that the nozzle having the smaller diameter is blocked by frozen moisture.

On the contrary, in order to inhibit freezing of moisture, it is possible to consider to add a heating unit to the ejector. However, since an external size of the ejector having more than one nozzle is larger than that of an ejection having a single nozzle, the heating unit may become large.

The disclosure has been accomplished in light of the foregoing problems, and an object of the disclosure is to provide a fuel cell system that is able to inhibit freezing of moisture inside an ejector while an increase in size is suppressed.

A fuel cell system described in the specification includes a fuel cell, an ejector, and a heating unit. The fuel cell is configured to generate power due to a chemical reaction between fuel gas and oxidant gas. The ejector includes a first nozzle and a second nozzle having injection ports with different diameters, respectively. The injection ports are configured to inject the fuel gas. The ejector is configured to introduce off gas to the fuel cell together with the fuel gas. The off gas is recirculated from the fuel cell. The heating unit is configured to heat the ejector. The diameter of the injection port of the second nozzle is smaller than the diameter of the first nozzle. The heating unit is arranged on a side of the second nozzle of the ejector, out of the first nozzle and the second nozzle.

In the foregoing configuration, the fuel cell system may further include a heat conduction member sandwiched between the ejector and the heating unit, and the heat conduction member may be configured to be deformed in accordance with shapes of the ejector and the heating unit.

In the foregoing configuration, the heating unit may be provided along a gas pipe in which the fuel gas flows to the second nozzle.

In the foregoing configuration, the fuel cell system may further include a heat conduction member sandwiched between the gas pipe and the heating unit, and the heat conduction member may be configured to be deformed in accordance with shapes of the gas pipe and the heating unit.

In the foregoing configuration, the heating unit may include one of a pair of end plates, the end plates sandwiching the fuel cell.

In the foregoing configuration, the heating unit may include a cooling pipe in which a cooling medium that cools the fuel cell flows.

In the foregoing configuration, the heating unit may include a heater configured to generate heat as power is supplied to the heater from a battery.

In the foregoing configuration, the heating unit may include a cooling pipe in which a cooling medium that cools the fuel cell flows, and the gas pipe and the cooling pipe may have a structure in which heat exchange is performed between the cooling medium and the fuel gas.

In the foregoing configuration, the fuel cell system may include an auxiliary heating unit configured to heat the ejector with an amount of heat smaller than that of the heating unit. The auxiliary heating unit may be arranged on a side of the first nozzle of the ejector out of the first nozzle and the second nozzle.

According to the disclosure, it is possible to inhibit freezing of moisture inside the ejector while an increase in size is suppressed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Configuration of Fuel Cell System

Figure 1:
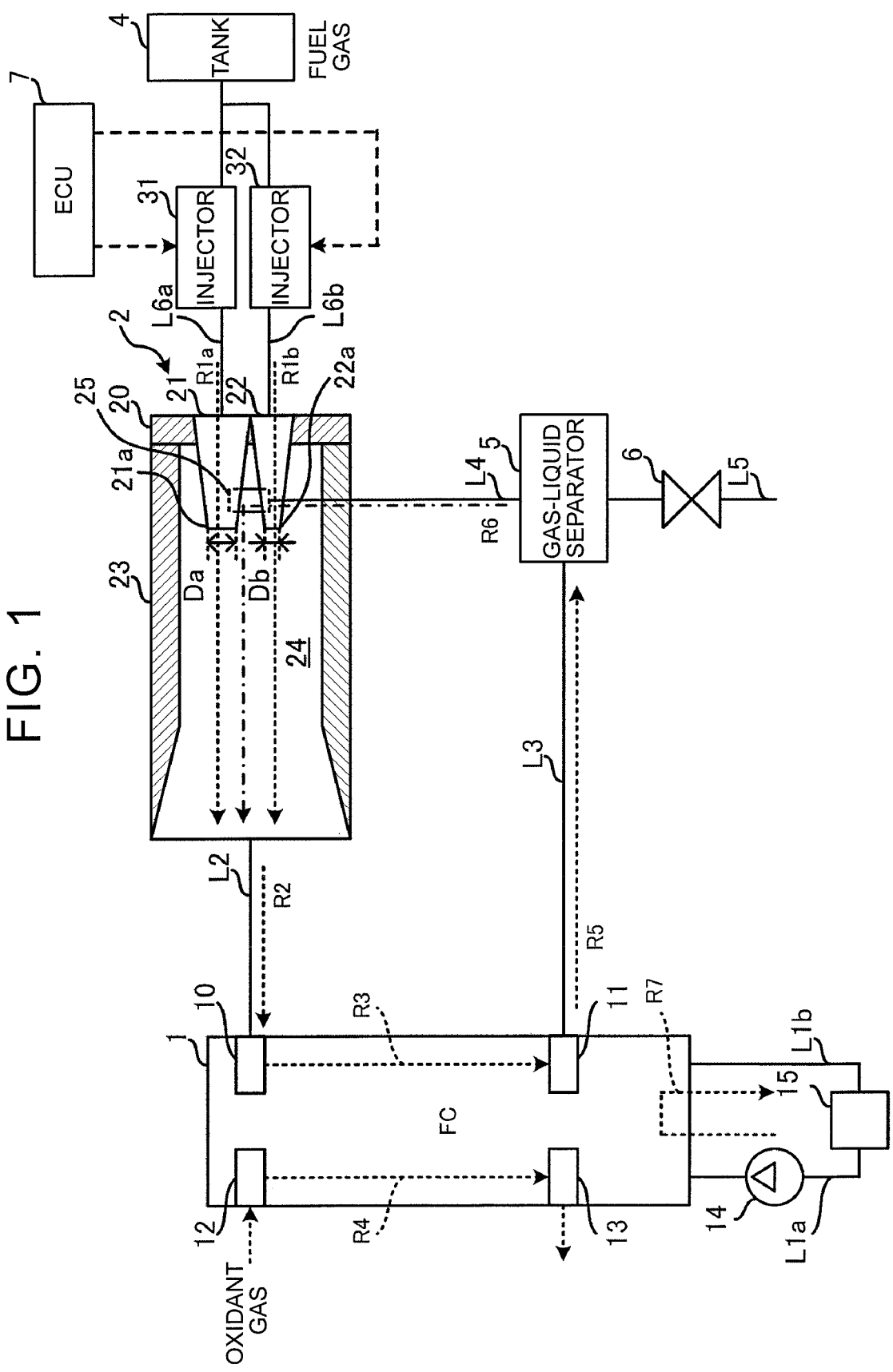
FIG. 1 is a configuration view showing an example of a fuel cell system.

FIG. 1 is a configuration view showing an example of a fuel cell system. The fuel cell system includes a fuel cell stack (FC) 1, an ejector 2, injectors 31, 32, a tank 4, a gas-liquid separator 5, an exhaust valve 6, and an ECU 7.

The fuel cell stack 1 has a laminated body in which a plurality of solid polymer type fuel cells (single cells) is laminated. Hydrogen gas as an example of fuel gas and air as an example of oxidant gas are supplied to the fuel cell stack 1, and the fuel cell stack 1 generates power due to a chemical reaction between the hydrogen gas and oxygen contained in the air.

The fuel cell stack 1 includes manifold holes 10, 11, 12, 13 that pass through the laminated body in a laminating direction. The manifold hole 10 is an inlet for the hydrogen gas, and the manifold hole 11 is an outlet for the hydrogen gas. The manifold hole 12 is an inlet for the air, and the manifold hole 13 is an outlet for the air.

Air is supplied to the fuel cell stack 1 through the manifold hole 12, and air used for power generation is discharged from the manifold hole 13 (see reference numeral R4). Further, the hydrogen gas is supplied to the fuel cell stack 1 through the manifold hole 10, and the hydrogen gas (off gas) used for power generation is discharged from the manifold hole 11 (see reference numeral R3). A configuration regarding supply and discharge of air is not shown.

The ejector 2 is connected with the manifold hole 10 on the inlet side through a supply route L2. Therefore, the fuel gas is supplied to the fuel cell stack 1 from the ejector 2 through the supply route L2.

The gas-liquid separator 5 is connected with the manifold hole 11 on the outlet side through a discharge route L3. In the fuel cell stack 1, the fuel gas used for power generation is discharged as the off gas from the manifold hole 11 through the discharge route L3.

Further, the fuel cell stack 1 is connected with a radiator 15 through cooling pipes L1a, L1b in which coolant for cooing the fuel cell stack 1 flows. The radiator 15 cools the coolant in which temperature is increased due to cooling of the fuel cell stack 1.

The cooling pipe L1a is provided with a pump 14 that feeds the coolant under pressure. Thus, as shown by reference numeral R7, the coolant flows in the cooling pipe L1a from the radiator 15 and is supplied to the fuel cell stack 1. Also, the coolant flows in the cooling pipe L1b from the fuel cell stack 1 and is circulated to the radiator 15.

As shown by reference numeral R5, the gas-liquid separator 5 separates moisture contained in the off gas that flows into the gas-liquid separator 5 from the discharge route L3. The moisture is accumulated in, for example, a water storage tank below the gas-liquid separator 5.

The gas-liquid separator 5 is connected with the ejector 2 through a recirculation route L4, and connected with an exhaust route L5 in which the exhaust valve 6 is provided. When the exhaust valve 6 opens, the moisture accumulated in the gas-liquid separator 5 is discharged from the exhaust route L5 together with the off gas. When the exhaust valve 6 is closed, as shown by reference numeral R6, the off gas flows from the gas-liquid separator 5 into the ejector 2 through the recirculation route L4, and is then recirculated to the fuel cell stack 1. The supply route L2, the discharge route L3, and the recirculation route L4 are pipes in which the fuel gas passes.

In the ejector 2, the fuel gas supplied from the injectors 31, 32 is mixed with the off gas from the recirculation route L4, and the ejector 2 supplies the mixed gas to the fuel cell stack 1. FIG. 1 shows a section of the ejector 2 taken along a direction in which the fuel gas flows.

The ejector 2 includes a large-diameter nozzle 21 and a small-diameter nozzle 22, a plate-shaped fixing portion 20, and a diffuser 23. The large-diameter nozzle 21 and the small-diameter nozzle 22 have injection ports 21a, 22a that inject the fuel gas, respectively, and diameters Da, Db of the injection ports 21a, 22a are different from each other. The large-diameter nozzle 21 and the small-diameter nozzle 22 are fixed to the fixing portion 20. The diffuser 23 is provided with a flow passage 24 in which the mixed gas of the off gas and the fuel gas flows. The fixing portion 20 is provided on a first end side of the diffuser 23. A second end side of the diffuser 23 is connected with the manifold hole 10 on the inlet side through the supply route L2. An opening 25 connected with the recirculation route L4 is provided in the diffuser 23.

The diameter Da of the large-diameter nozzle 21 is larger than the diameter Db of the small-diameter nozzle 22. As described later, the large-diameter nozzle 21 and the small-diameter nozzle 22 are used properly depending on an operating state of the fuel cell system. The large-diameter nozzle 21 is an example of a first nozzle, and the small-diameter nozzle 22 is an example of the second nozzle. A material for the ejector 2 may be, for example, steel use stainless (SUS) but is not limited to this.

The large-diameter nozzle 21 is connected with the first injector 31 through a gas pipe L6a. The small-diameter nozzle 22 is connected with the second injector 32 through a gas pipe L6b. The injectors 31, 32 supply the hydrogen gas stored under pressure inside the tank 4 to the large-diameter nozzle 21 and the small-diameter nozzle 22 through the gas pipes L6a, L6b, respectively.

The large-diameter nozzle 21 injects the fuel gas from the injection port 21a, the fuel gas being supplied from the injector 31. The small-diameter nozzle 22 injects the fuel gas from the injection port 22a, the fuel gas being supplied from the injector 32.

As shown by a broken line, the injectors 31, 32 supply the hydrogen gas in accordance with an electric control signal that is individually input from the ECU 7. Supply amounts of the hydrogen gas from the injectors 31, 32 are determined depending on a duty ratio of the control signal. For example, when a logical value of the control signal is "0", the injectors 31, 32 stop supplying the fuel gas, and, when the logical value of the control signal is "1", the injectors 31, 32 supply the fuel gas.

The ECU 7 includes, for example, a central processing unit (CPU), and a memory or the like that stores a program by which the CPU is operated, and the ECU 7 thus controls operations of the fuel cell system. For example, the ECU 7 controls the injectors 31, 32 with use of the control signal depending on an operating state of the fuel cell stack 1.

The ECU 7 causes the injectors 31, 32 to operate so that the injectors 31, 32 supply the fuel gas in accordance with, for example, electric power required by the fuel cell stack 1, in other words, a load of the fuel cell stack 1. The large-diameter nozzle 21 and the small-diameter nozzle 22 connected with the injectors 31, 32, respectively, have different circulation amounts of the fuel gas with respect to the supply amount of the fuel gas due to the different diameters of the injection ports 21a, 21b. The supply amount means an amount of the fuel gas that is supplied to the fuel cell stack 1 per unit time, and the circulation amount means an amount of the fuel gas that flows in the recirculation route L4 per unit time.

The diameter Db of the injection port 22a of the small-diameter nozzle 22 is smaller than the diameter Da of the injection port 21a of the large-diameter nozzle 21. Therefore, a ratio of the circulation amount to the supply amount of the small-diameter nozzle 22 is larger than that of the large-diameter nozzle 21. Therefore, when a load of the fuel cell stack 1 is smaller than that in a normal operating state, and the supply amount is small such as when the fuel cell system is started, a larger circulation amount is obtained with the injection from the small-diameter nozzle 22 than the injection of the large-diameter nozzle 21. In this case, it is preferred that the diameter of the small-diameter nozzle 22 is, for example, from 0.2 mm to 1.2 mm, and the diameter of the large-diameter nozzle 21 is twice the diameter of the small-diameter nozzle 22 or smaller.

A maximum supply amount by the injection from the small-diameter nozzle 22 is smaller than a maximum supply amount by the injection from the large-diameter nozzle 21 because the diameter Db of the injection port 22a of the small-diameter nozzle 22 is smaller than the diameter Da of the injection port 21a of the large-diameter nozzle 21. Therefore, if the large-diameter nozzle 21 is not provided in the ejector 2, it is not possible to obtain a sufficient supply amount with respect to the load in the normal operating state. However, when the load is large and the supply amount is large, as the large-diameter nozzle 21 injects the fuel gas, a larger supply amount than that of the injection from the small-diameter nozzle 22 is obtained. At the same time, a sufficient circulation amount in accordance with the supply amount is obtained.

Therefore, for example, when the load is small, the ECU 7 causes the second injector 32 to operate, and, when the load is high, the ECU 7 causes the first injector 31 to operate.

As shown by reference numeral R1a, the large-diameter nozzle 21 injects the fuel gas from the injection port 21a to the flow passage 24. The fuel gas inside the flow passage 24 acts as driving fluid of the ejector 2. Therefore, the off gas in the gas-liquid separator 5 and the recirculation route L4 is sucked into the flow passage 24 from the opening 25 of the diffuser 23 as shown by the reference numeral R6.

As shown by reference numeral R1b, the small-diameter nozzle 22 injects the fuel gas from the injection port 22a to the flow passage 24. In this case, similarly to the case of the injection from the large-diameter nozzle 21, the off gas in the gas-liquid separator 5 and the recirculation route L4 is sucked into the flow passage 24 from the opening 25 of the diffuser 23 as shown by the reference numeral R6.

The fuel gas injected from the large-diameter nozzle 21 or the small-diameter nozzle 22 is mixed with the off gas in the diffuser 23, the off gas being sucked in from the opening 25, and then flows into the manifold hole 10 through the supply route L2 as shown by reference numeral R2. This means that the ejector 2 introduces the off gas together with the fuel gas to the fuel cell stack 1. Because of this, the fuel cell stack 1 is able to reuse the off gas for power generation.

However, the off gas contains moisture generated due to power generation inside the fuel cell stack 1. Therefore, in, for example, a subfreezing environment, the moisture contained in the off gas retained in the ejector 2 may freeze and block a flow of the fuel gas and the off gas.

Therefore, in the fuel cell system, a heating unit is provided that heats the ejector 2 so that freezing of the moisture is inhibited. As described in each example below, the heating unit is arranged on a side of the small-diameter nozzle 22 of the ejector 2 out of the large-diameter nozzle 21 and the small-diameter nozzle 22.

Since the diameter Db of the injection port 22b of the small-diameter nozzle 22 is smaller than the diameter Da of the large-diameter nozzle 21, the small-diameter nozzle 22 is more likely to be blocked by freezing of the moisture compared to the large-diameter nozzle 21. As the heating unit is arranged on the side of the small-diameter nozzle 22 of the ejector 2, it is possible to heat the small-diameter nozzle 22 first before the large-diameter nozzle 21 is heated. Therefore, it is possible to inhibit freezing of moisture effectively.

Further, since the heating unit is arranged on the side of the small-diameter nozzle 22 of the ejector 2, a size of the heating unit is reduced compared to, for example, that in a case where the heating unit is arranged in the entire periphery of the ejector 2 so that the entire ejector 2 including both the large-diameter nozzle 21 and the small-diameter nozzle 22 is evenly heated. Descriptions are given with reference to examples of the heating unit.

First Example

Figure 2:
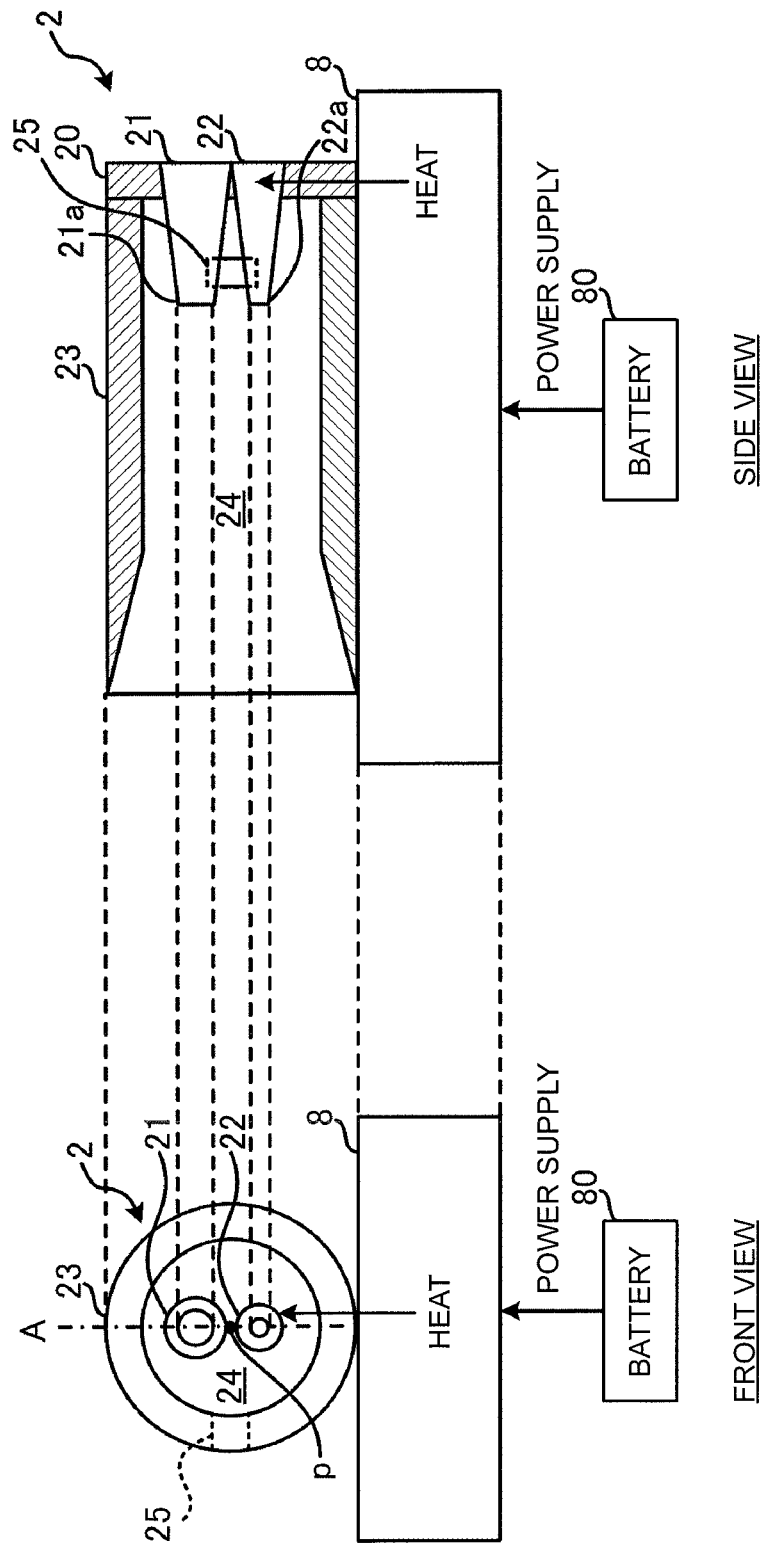
FIG. 2 is a view of a heating unit according to a first example.

FIG. 2 is a view of a heating unit according to a first example. FIG. 2 shows a front view and a side view of the heating unit with respect to a direction in which the fuel gas is injected from the large-diameter nozzle 21 and the small-diameter nozzle 22. For example, the large-diameter nozzle 21 and the small-diameter nozzle 22 are arrayed along a diameter direction of the cylindrical diffuser 23, and are arranged at positions symmetrical to each other with respect to a center p of a circle.

The heating unit includes, for example, a heater 8 that has a flat plate shape. The heater 8 generates heat as, for example, power is supplied from a battery 80 that stores power of the fuel cell stack 1. The heater 8 is in direct contact with outer peripheral surfaces of the diffuser 23 and the fixing portion 20 on the small-diameter nozzle 22 side. Therefore, heat of the heater 8 is conducted to the large-diameter nozzle 21 and the small-diameter nozzle 22 through the diffuser 23 and the fixing portion 20.

In this case, since the heater 8 is positioned on the small-diameter nozzle 22 side in a view from the center p of the diffuser 23, the small-diameter nozzle 22 is heated first before the large-diameter nozzle 21 is heated. Because of this, it is possible to inhibit freezing of moisture inside the ejector 2 effectively. Further, since the heater 8 is arranged on the small-diameter nozzle 22 side, it is possible to reduce the size of the heater 8 compared to that in a case where the heater 8 is arranged in the entire periphery of the ejector 2, and it is thus possible to use the heater 8 having a size similar to that of a universal heater.

Further, since the heater 8 is used as the heating unit, it is possible to increase a heating amount compared to heating units in other examples described later. Further, since power is supplied to the heater 8 from the battery 80, it is possible to heat the ejector 2 even when the fuel cell stack 1 stops power generation.

Second Example

Figure 3:
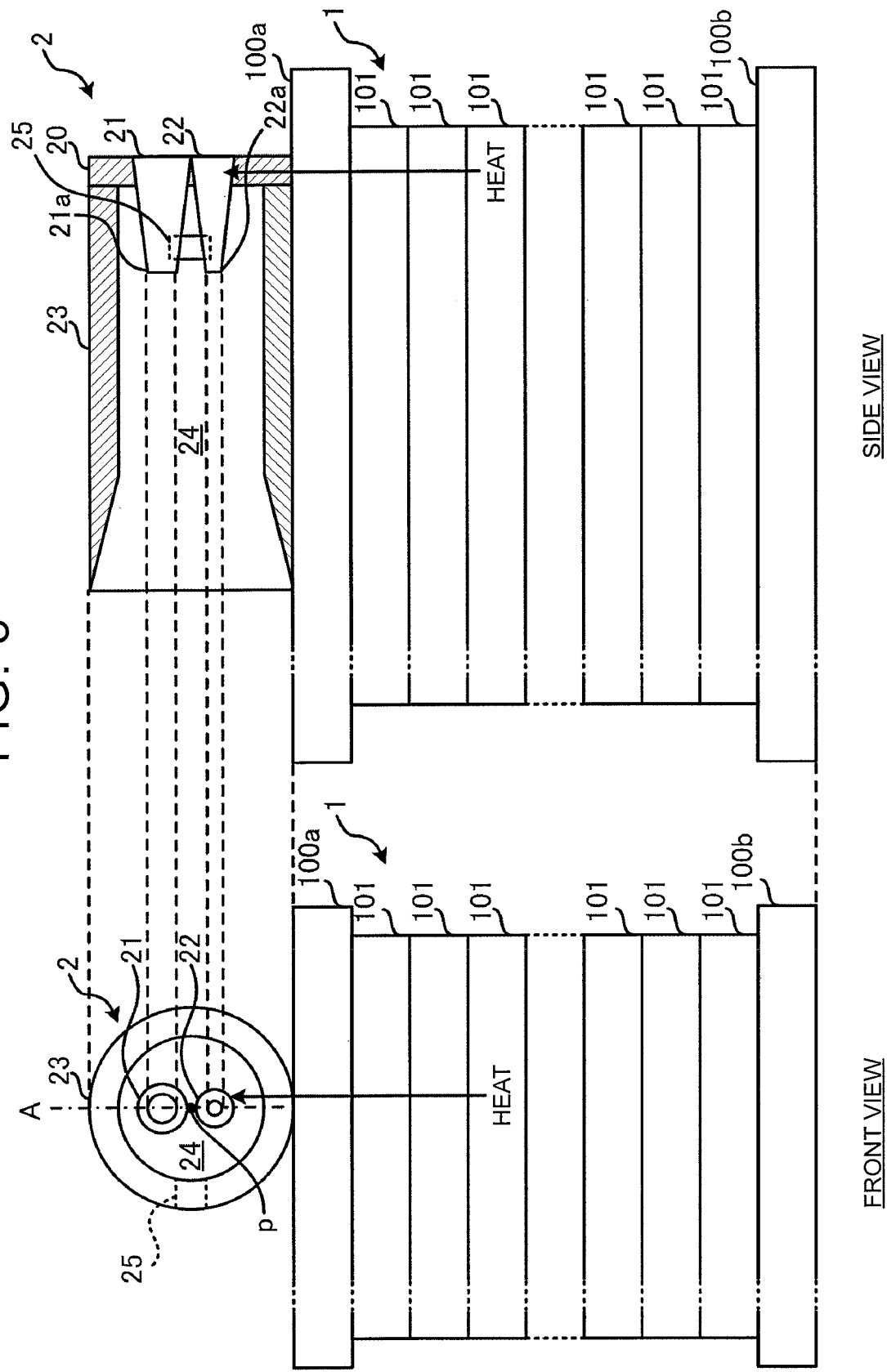
FIG. 3 is a view of a heating unit according to a second example.

FIG. 3 is a view of a heating unit according to a second example. FIG. 3 shows a front view and a side view of the heating unit with respect to the direction in which the fuel gas is injected from the large-diameter nozzle 21 and the small-diameter nozzle 22. In FIG. 3, the same reference numerals are used for the same components as those in FIG. 2, and description thereof is omitted.

The fuel cell stack 1 includes a plurality of single cells 101 that are fuel cells, and a pair of end plates 100a, 100b that sandwiches the single cells 101. The heating unit includes the end plate 100a on a first side. The ejector 2 is mounted on a plate surface of the end plate 100a so that the end plate 100a is positioned on the small-diameter nozzle 22 side.

The each of the single cells 101 generates power due to the chemical reaction between the fuel gas and the oxidant gas, and heat generated due to the power generation is conduced to the end plate 100a. The end plate 100a is in direct contact with the outer peripheral surfaces of the diffuser 23 and the fixing portion 20 on the small-diameter nozzle 22 side. Therefore, heat of the end plate 100a is conducted to the large-diameter nozzle 21 and the small-diameter nozzle 22 through the diffuser 23 and the fixing portion 20.

In this case, since the end plate 100a is positioned on the small-diameter nozzle 22 side in a view from the center p of the diffuser 23, the small-diameter nozzle 22 is heated first before the large-diameter nozzle 21 is heated. Because of this, freezing of moisture inside the ejector 2 is effectively inhibited. Further, since the end plate 100a is arranged on the small-diameter nozzle 22 side, it is not necessary to have, for example, a large and complex shape that covers the entire periphery of the ejector 2, and it is thus possible to use a normal end plate that has a small and simple flat-plate shape.

Third Example

In the second example, the end plate 100a has the flat plate shape. Further, for example, the diffuser 23 has a cylinder shape, and the fixing portion 20 has a disc shape. Therefore, a contact area between the end plate 100a, and the diffuser 23 and the fixing portion 20 is limited to a narrow region of the surface of the ejector 2. Accordingly, a deformable heat conduction member may be provided between the ejector 2 and the end plate 100a.

Figure 4:
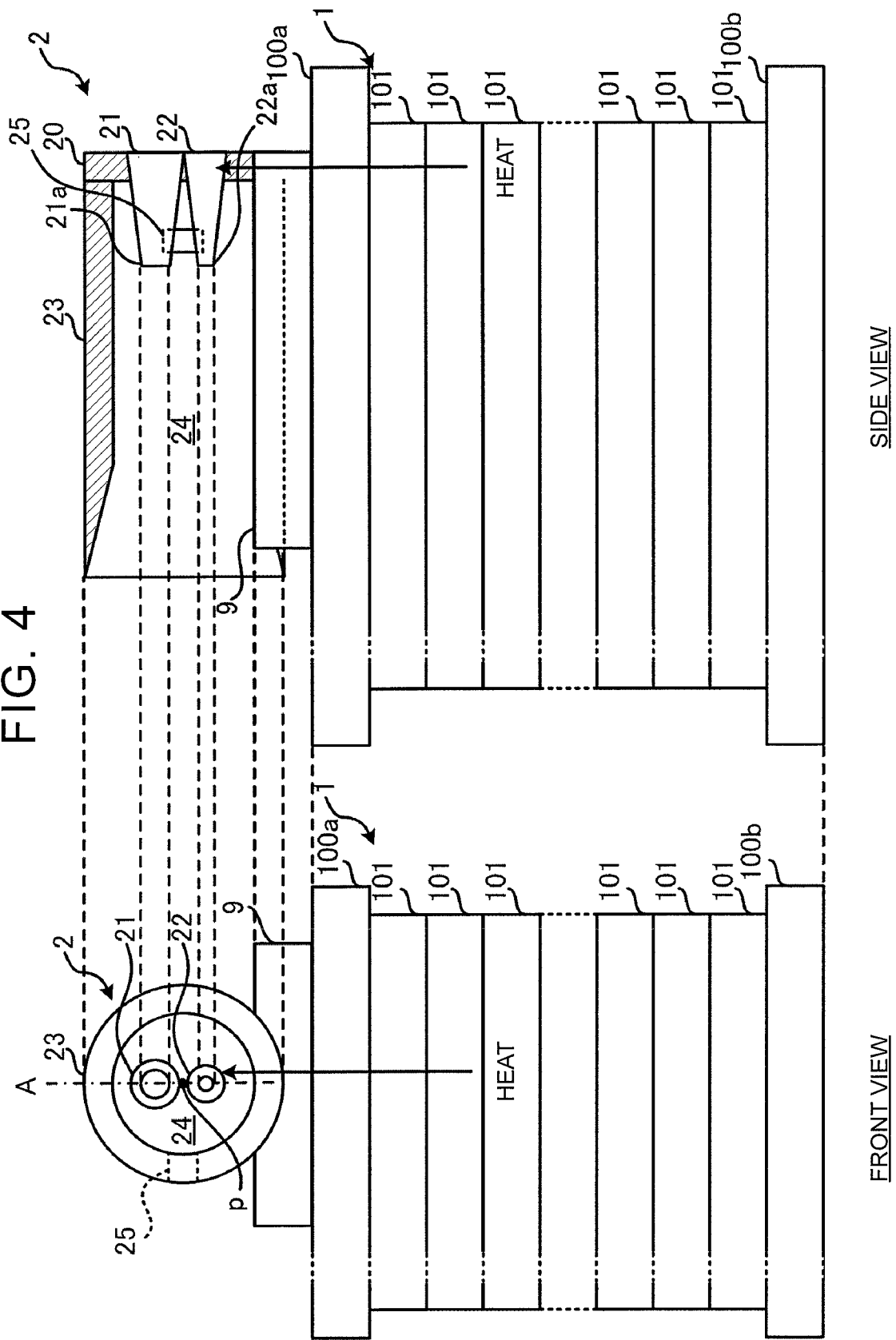
FIG. 4 is a view of a heating unit according to a third example.

FIG. 4 is a view of a heating unit according to a third example. In FIG. 4, the same reference numerals are used for the same components as those in FIG. 3, and description thereof is omitted.

A heat conduction member 9 is, for example, a silicon-based heat dissipation sheet, thermal grease, and so on, and is sandwiched between the ejector 2 and the end plate 100a. The heat conduction member 9 absorbs heat from the end plate 100a and, and the heat is conducted to the ejector 2.

The heat conduction member 9 is deformed in accordance with the shapes of the ejector 2 and the end plate 100a. Therefore, the contact area between the ejector 2 and the end plate 100a is larger than that in the second example. Therefore, an amount of heat conducted from the end plate 100a to the ejector 2 increases, and freezing of moisture contained in the off gas inside the ejector 2 is thus effectively inhibited.

Fourth Example

Figure 5:
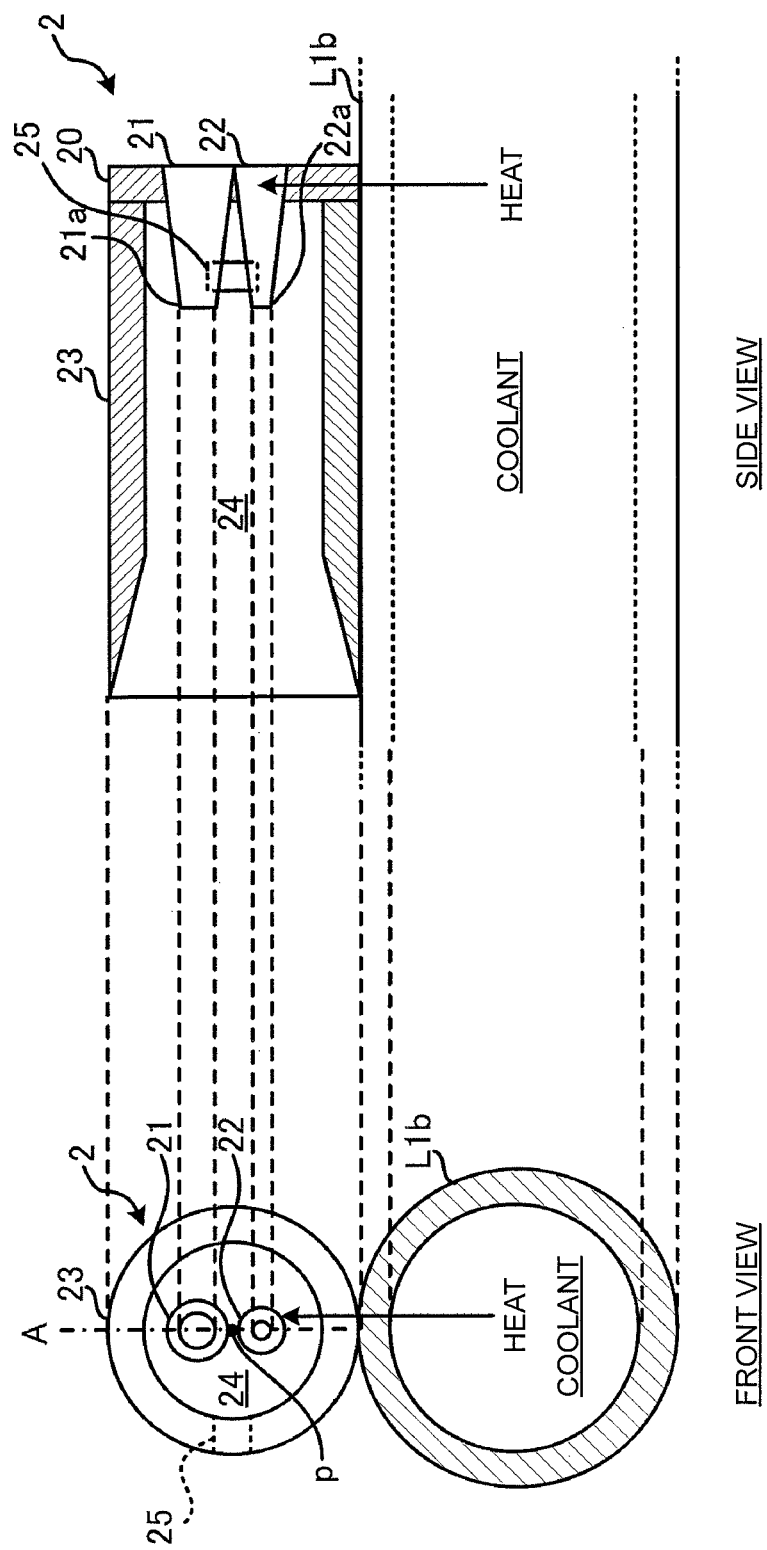
FIG. 5 is a view of a heating unit according to a fourth example.

FIG. 5 is a view of a heating unit according to a fourth example. FIG. 5 shows a front view and a side view of the heating unit with respect to the direction in which the fuel gas is injected from the large-diameter nozzle 21 and the small-diameter nozzle 22. In FIG. 5, the same reference numerals are used for the same components as those in FIG. 2, and description thereof is omitted.

The heating unit includes, for example, a cylinder-shaped cooling pipe L1b. In the cooling pipe L1b, coolant that cools the fuel cell stack 1 flows. In the front view, a section of the cooling pipe L1b that is taken along a direction orthogonal to a flow of the coolant is shown.

The cooling pipe L1b is in direct contact with the outer peripheral surfaces of the diffuser 23 and the fixing portion 20 on the small-diameter nozzle 22 side. Therefore, heat of the coolant is conducted to the large-diameter nozzle 21 and the small-diameter nozzle 22 through the diffuser 23 and the fixing portion 20.

In this case, since the cooling pipe L1b is positioned on the small-diameter nozzle 22 side in a view from the center p of the diffuser 23, the small-diameter nozzle 22 is heated first before the large-diameter nozzle 21 is heated. Thus, freezing of moisture inside the ejector 2 is effectively inhibited. Further, since the cooling pipe L1b is arranged on the small-diameter nozzle 22 side, it is not necessary for the cooling pipe L1b to have, for example, a large and complex shape that covers the entire periphery of the ejector 2, and it is possible to use a normal pipe with a small and simple cylinder shape.

In this example, the cooling pipe L1b used as the heating unit is for the coolant before being cooled again by the radiator 15. However, instead of the cooling pipe L1b, a cooling pipe L1a for the coolant after being cooled again by the radiator 15 may be used. Temperature of the coolant before being cooled again is higher than that of the coolant after being cooled again. Therefore, when the cooling pipe L1b is used as the heating unit, it is possible to heat the ejector 2 with a larger amount of heat compared to the case where the cooling pipe L1a is used.

Fifth Example

In the fourth example, the cooling pipe Lib has the cylinder shape. Also, for example, the diffuser 23 has the cylinder shape, and the fixing portion 20 has the disc shape. Therefore, the contact area between the end plate 100, and the diffuser 23 and the fixing portion 20 is limited to a narrow region of the surface of the ejector 2. Hence, similarly to the third example, a heat conduction member may be provided between the ejector 2 and the cooling pipe L1b.

Figure 6:
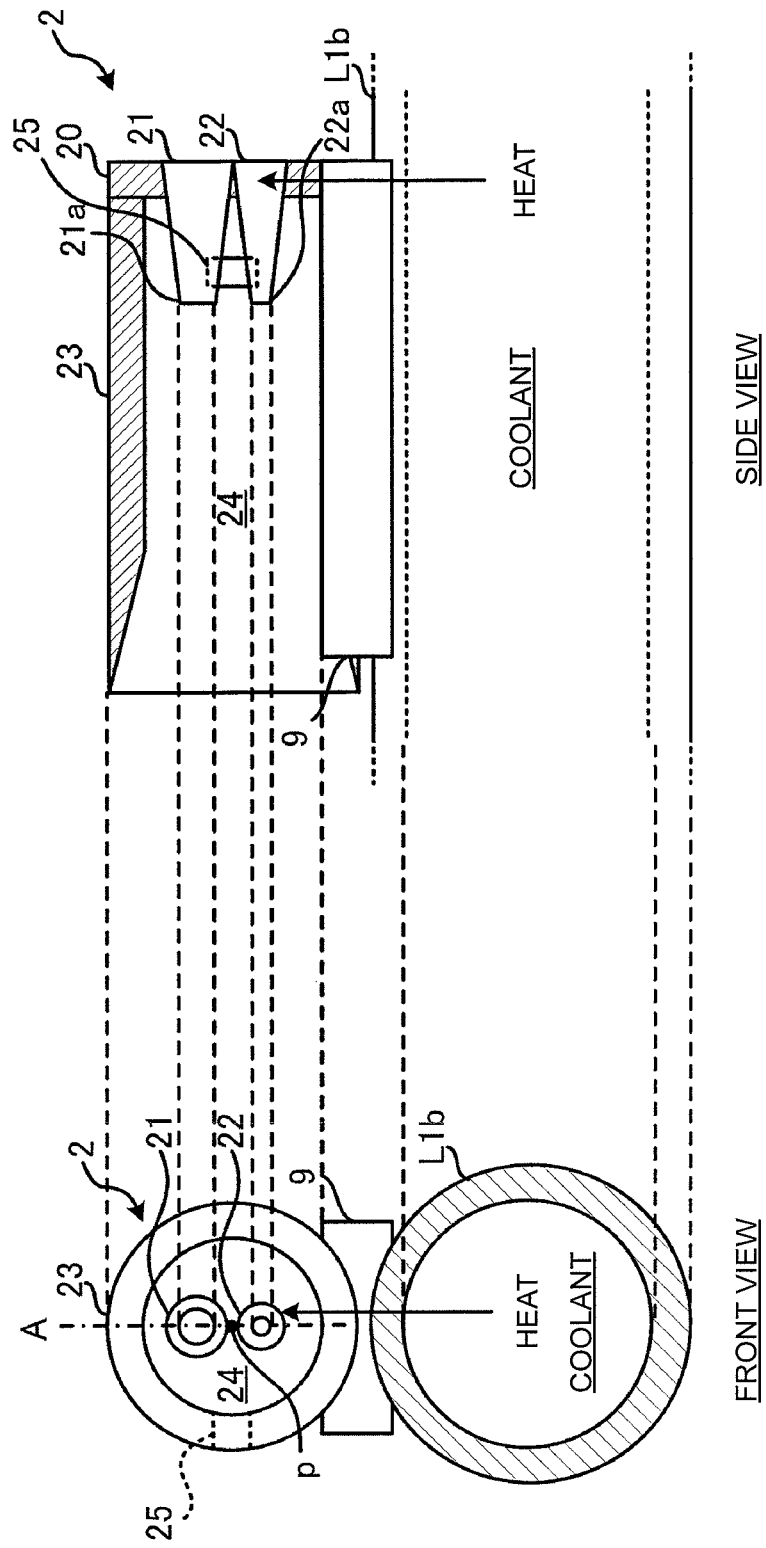
FIG. 6 is a view of a heating unit according to a fifth example.

FIG. 6 is a view of a heating unit according to a fifth example. In FIG. 6, the same reference numerals are used for the same components as those in FIG. 5, and description thereof is omitted.

The heat conduction member 9 is sandwiched between the ejector 2 and the cooling pipe L1b. The heat conduction member 9 absorbs heat from the cooling pipe L1b, and the heat is conducted to the ejector 2.

The heat conduction member 9 is deformed in accordance with the shapes of the ejector 2 and the cooling pipe L1b. Therefore, the contact area between the ejector 2 and the cooling pipe Lib becomes wider than the fourth example. Hence, an amount of heat conducted from the cooling pipe L1b to the ejector 2 increases, and freezing of moisture contained in the off gas inside the ejector 2 is thus effectively inhibited.

Sixth Example

So far, the examples have been described in which the heating unit is arranged on the ejector 2 on the small-diameter nozzle 22 side only. However, an auxiliary heating unit may be additionally arranged on the ejector 2 on the large-diameter nozzle 21 side, the auxiliary heating unit heating the ejector 2 with a smaller amount of heat compared to the heating unit.

Figure 7:
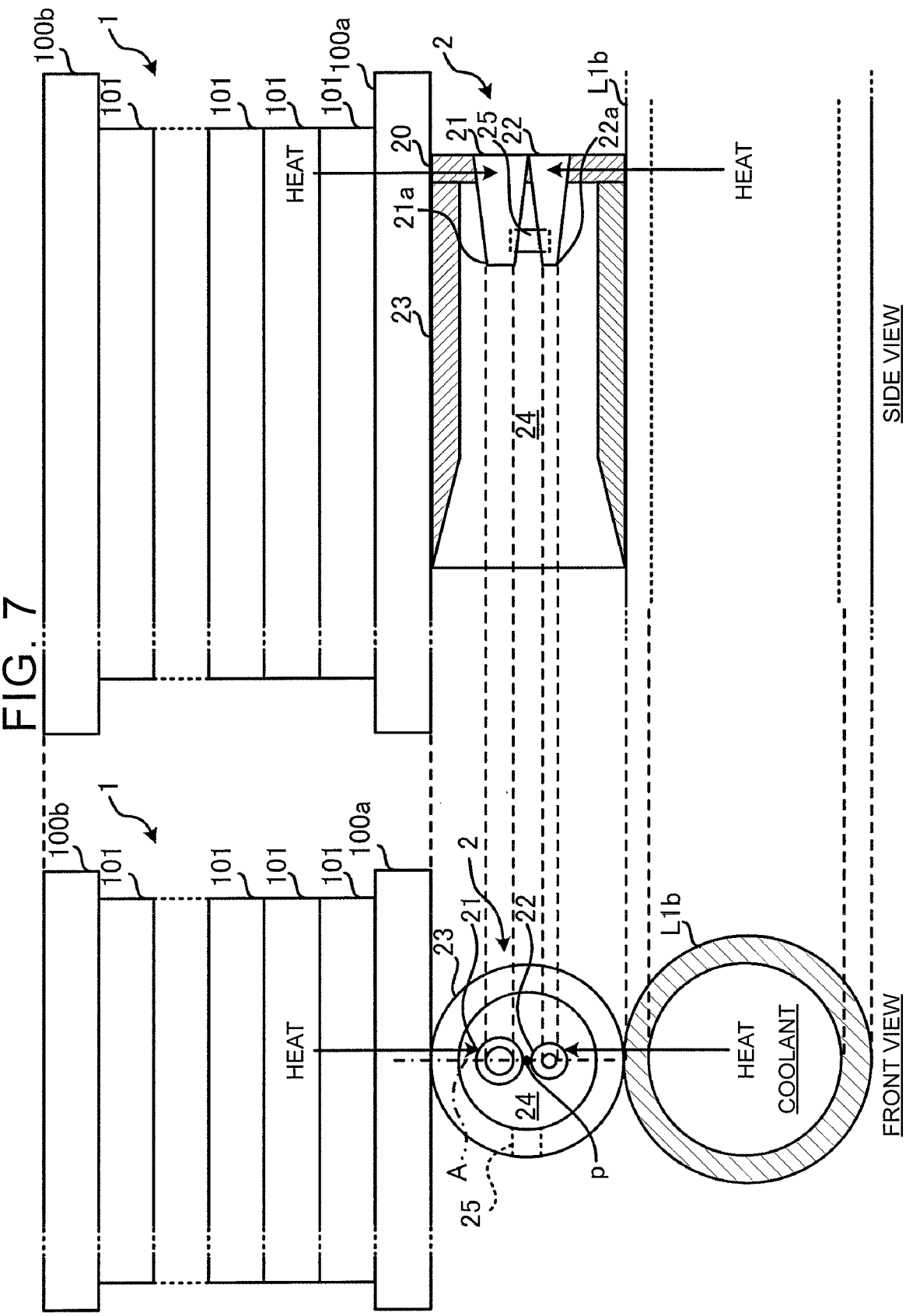
FIG. 7 is a view of a heating unit according to a sixth example.

FIG. 7 is a view of a heating unit according to a sixth example. In FIG. 7, the same reference numerals are used for the same components as those in FIG. 3 and FIG. 5, and description thereof is omitted.

In this example, the heating unit has a configuration in which the auxiliary heating unit is provided on the ejector 2 on the large-diameter nozzle 21 side in addition to the configuration of the fourth example. The auxiliary heating unit includes, for example, the end plate 100a.

The ejector 2 is mounted on a plate surface of the end plate 100a so that the end plate 100a is positioned on the large-diameter nozzle 21 side. The end plate 100a is in direct contact with the outer peripheral surfaces of the diffuser 23 and the fixing portion 20 on the large-diameter nozzle 21 side. Therefore, heat of the end plate 100a is conducted to the large-diameter nozzle 21 and the small-diameter nozzle 22 through the diffuser 23 and the fixing portion 20.

The end plate 100a heats the ejector 2 with an amount of heat smaller than that of the cooling pipe L1b. This is because the coolant inside the cooling pipe L1b absorbs heat from each of the single cells 101, and remaining heat is conducted to the end plate 100a.

Since the end plate 100a is arranged on the ejector 2 on the large-diameter nozzle 21 side, the large-diameter nozzle 21 is heated with an amount of heat smaller than that used for heating the small-diameter nozzle 22. Therefore, freezing of moisture contained in the off gas inside the ejector 2 is effectively inhibited by heat of the cooling pipe L1b and the end plate 100a. Further, since the end plate 100a is arranged on the ejector 2 on the large-diameter nozzle 21 side instead of on the entire ejector 2, it is not necessary to have, for example, a large and complex shape that covers the entire periphery of the ejector 2, and it is thus possible to use a normal end plate with a small and simple flat-plate shape.

The combination of the heating unit and the auxiliary heating unit is not limited to this example. For example, the heater 8 may be used as the heating unit, and the cooling pipe L1b may be used as the auxiliary heating unit. Alternatively, the heater 8 may be used as the heating unit, and the end plate 100a may be used as the auxiliary heating unit. Also, in this example, similarly to the third example, the heat conduction member 9 may be sandwiched between the end plate 100a and the ejector 2. Also, similarly to the fifth example, the heat conduction member 9 may be sandwiched between the cooling pipe L1b and the ejector 2.

Seventh Example

In each of the examples described above, the ejector 2 is mounted on the heater 8, the end plate 100a, or the cooling pipe L1b serving as the heating unit. However, the disclosure is not limited to this. The heating unit may be provided along the gas pipe L6b in which the fuel gas flows to the small-diameter nozzle 22.

Figure 8:
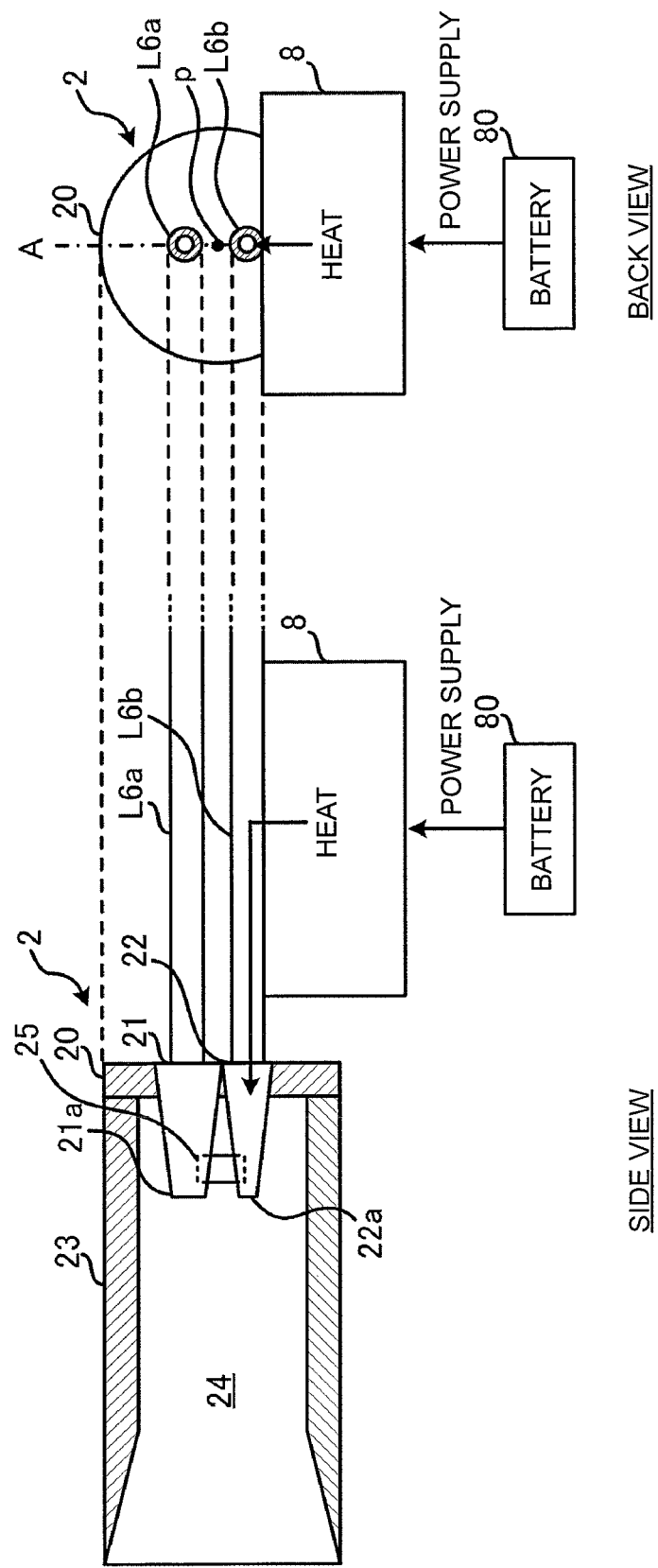
FIG. 8 is a view of a heating unit according to a seventh example.

FIG. 8 is a view of a heating unit according to a seventh example. FIG. 8 shows a back view and a side view of the heating unit with respect to the direction in which the fuel gas is injected from the large-diameter nozzle 21 and the small-diameter nozzle 22. In FIG. 8, the same reference numerals are used for the same components as those shown in FIG. 2, and description thereof is omitted.

On a back surface of the ejector 2, the gas pipes L6a, L6b extend along the injection direction of the large-diameter nozzle 21 and the small-diameter nozzle 22. In the gas pipes L6a, L6b, the fuel gas from the injectors 31, 32 flows, respectively. The gas pipe L6a on a first side is connected with the large-diameter nozzle 21, and the gas pipe L6b on a second side is connected with the small-diameter nozzle 22. The gas pipes L6a, L6b have, for example, a cylinder shape.

The heating unit includes the heater 8. The gas pipe L6b connected with the small-diameter nozzle 22 is mounted on a plate surface of the heater 8. This means that the heater 8 is arranged on the side of the small-diameter nozzle 22 of the ejector 2.

Heat of the heater 8 is conducted to the small-diameter nozzle 22 through the gas pipe L6b. Therefore, as described earlier, freezing of moisture contained in the off gas in the ejector 2 is effectively inhibited. Further, since the heater 8 is provided along the gas pipe L6b that is smaller than the ejector 2, it is possible to heat the small-diameter nozzle 22 sufficiently even with the small-sized heater 8.

Eighth Example

Figure 9:
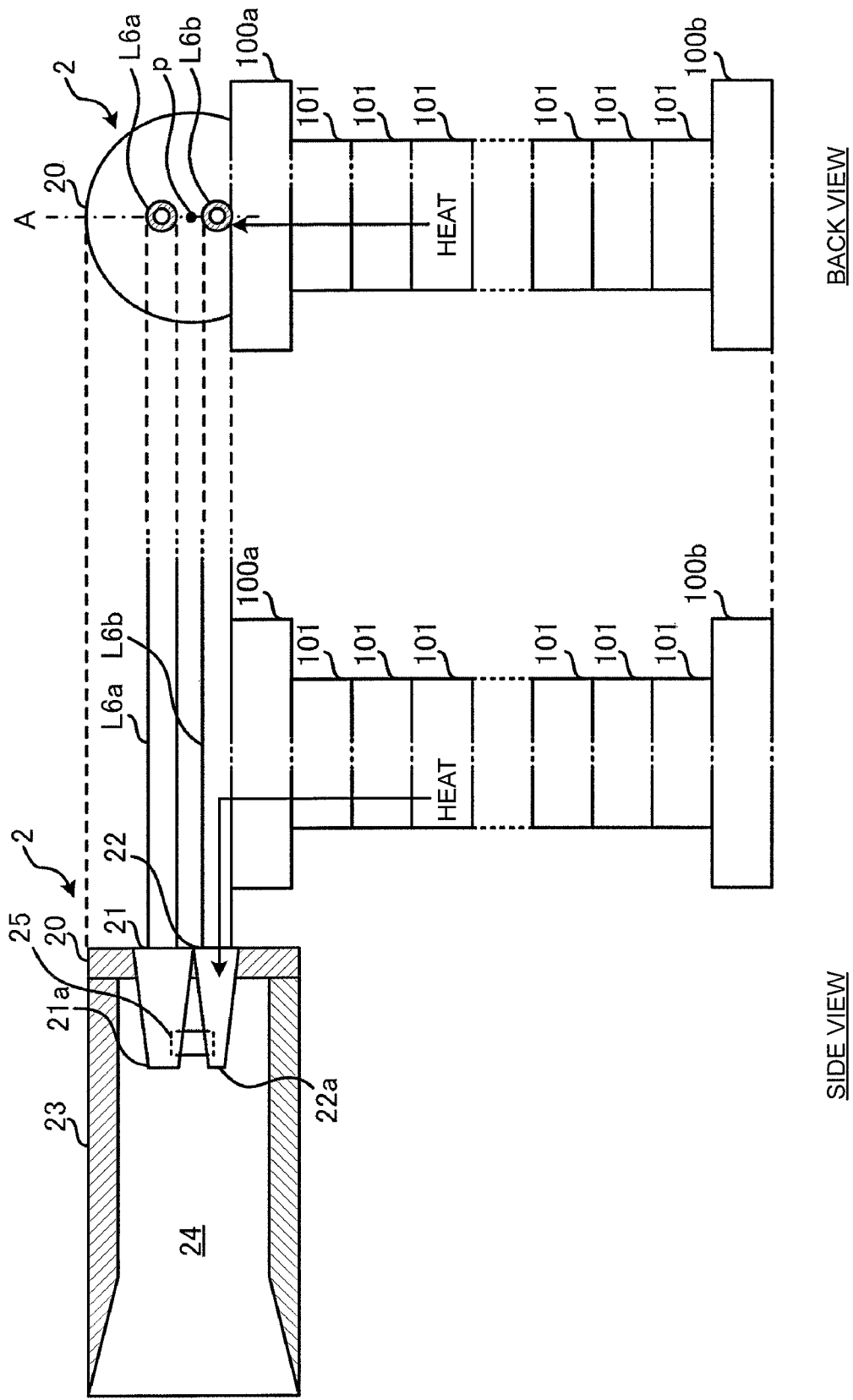
FIG. 9 is a view of a heating unit according to an eighth example.

FIG. 9 is a view of a heating unit according to an eighth example. FIG. 9 shows a back view and a side view of the heating unit with respect to the direction in which the fuel gas is injected from the large-diameter nozzle 21 and the small-diameter nozzle 22. In FIG. 9, the same reference numerals are used for the same components as those shown in FIG. 3, and description thereof is omitted.

The heating unit includes the end plate 100a. The gas pipe L6b connected with the small-diameter nozzle 22 is mounted on a plate surface of the end plate 100a. This means that the end plate 100a is arranged on the side of the small-diameter nozzle 22 of the ejector 2.

Heat of the end plate 100a is conducted to the small-diameter nozzle 22 through the gas pipe L6b. Therefore, as described above, freezing of moisture contained in the off gas in the ejector 2 is effectively inhibited. Further, since the end plate 100a is provided along the gas pipe L6b that is smaller than the ejector 2, it is possible to heat the small-diameter nozzle 22 sufficiently even with the small-sized end plate 100a.

Ninth Example

Figure 10:
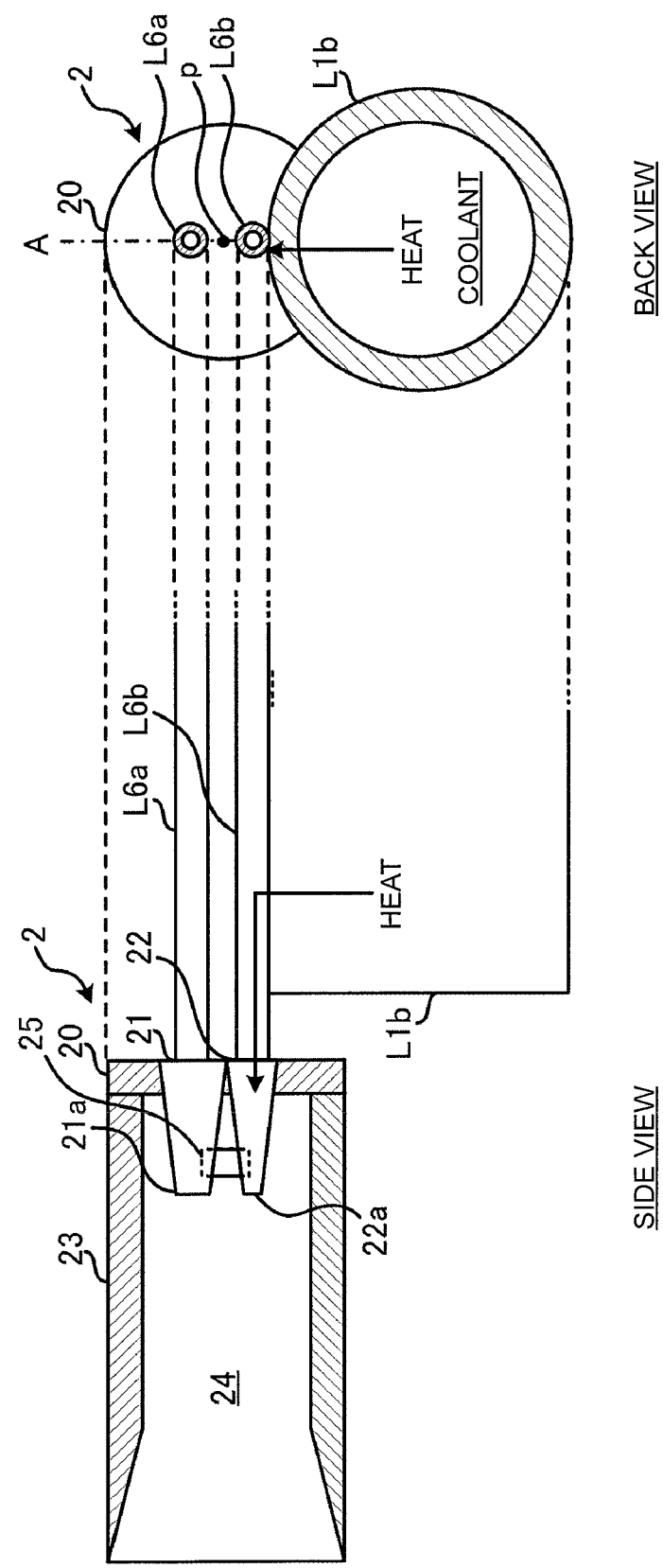
FIG. 10 is a view of a heating unit according to a ninth example.

FIG. 10 is a view of a heating unit according to a ninth example. FIG. 10 shows a back view and a side view of the heating unit with respect to the direction in which the fuel gas is injected from the large-diameter nozzle 21 and the small-diameter nozzle 22. In FIG. 10, the same reference numerals are used for the same components as those shown in FIG. 5, and description thereof is omitted.

The heating unit includes the cooling pipe L1b. The gas pipe L6b connected with the small-diameter nozzle 22 is mounted on the cooling pipe L1b. The cooling pipe L1b extends along the gas pipe L6b. This means that the cooling pipe L1b is arranged on the side of the small-diameter nozzle 22 of the ejector 2.

Heat of the cooling pipe L1b is conduced to the small-diameter nozzle 22 through the gas pipe L6b. Therefore, as described earlier, freezing of moisture contained in the off gas in the ejector 2 is effectively inhibited. Moreover, since the cooling pipe L1b is provided along the gas pipe L6b that is smaller than the ejector 2, it is possible to heat the small-diameter nozzle 22 sufficiently even with the small-sized cooling pipe L1b.

As the heating unit, the cooling pipe L1a may be used instead of the cooling pipe L1b. Further, in the seventh and eighth examples, it is possible to provide the auxiliary heating unit along the gas pipe L6a connected with the large-diameter nozzle 21, the auxiliary heating unit heating the ejector 2 with an amount of heat smaller than that of the heating unit. The combination of the heating unit and the auxiliary heating unit is described above.

Tenth Example

In the ninth example, in order to increase a contact area between the cooling pipe L1b and the gas pipe L6b, a heat conduction member similar to that described in the fifth example may be provided.

Figure 11:
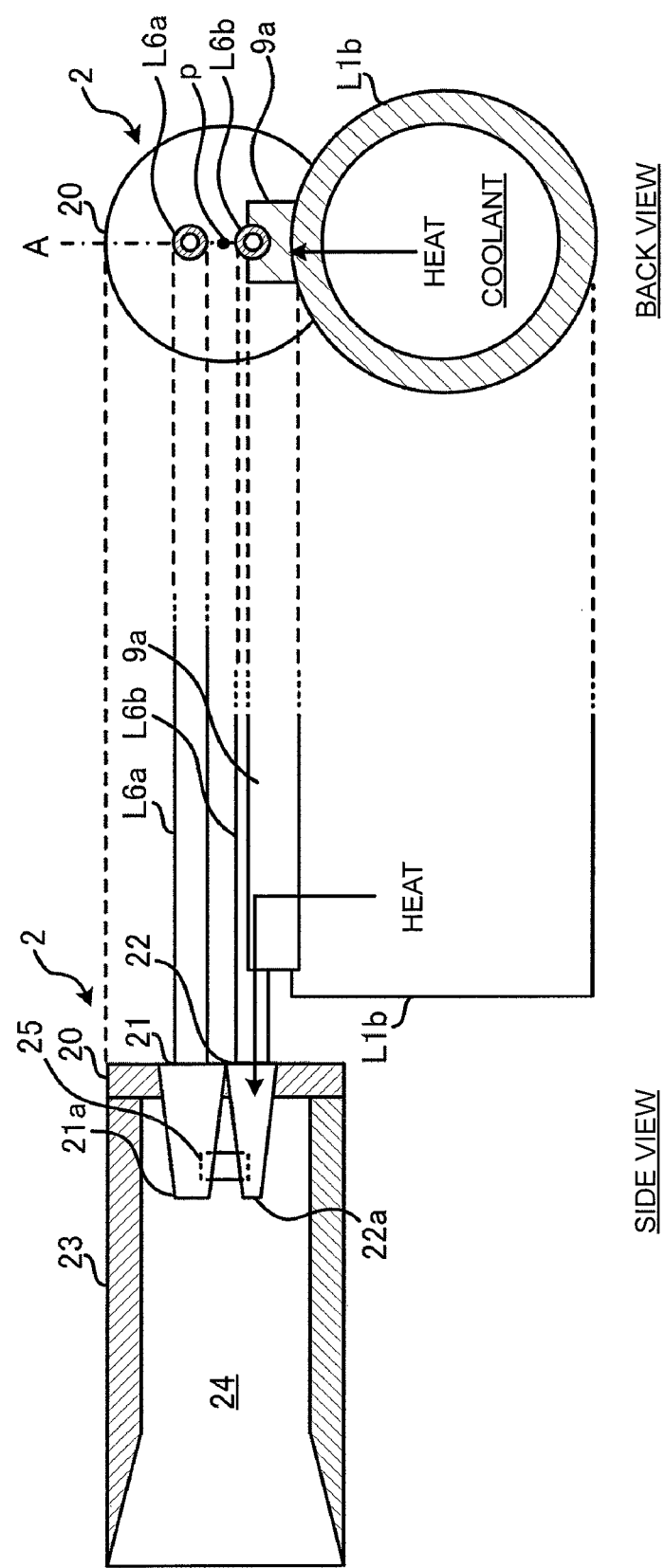
FIG. 11 is a view of a heating unit according to a tenth example.

FIG. 11 is a view of a heating unit according to a tenth example. FIG. 11 shows a back view and a side view of the heating unit with respect to the direction in which the fuel gas is injected from the large-diameter nozzle 21 and the small-diameter nozzle 22. In FIG. 11, the same reference numerals are used for the same components as those shown in FIG. 5, and description thereof is omitted.

A heat conduction member 9a is sandwiched between the gas pipe L6b and the cooling pipe L1b. The heat conduction member 9a is similar to the heat conduction member 9 described in the fifth example.

The heat conduction member 9a is deformed in accordance with the shapes of the gas pipe L6b and the cooling pipe L1b. Therefore, a contact area between the gas pipe L6b and the cooling pipe L1b is wider than that in the case of the ninth example. Therefore, an amount of heat conducted from the cooling pipe L1b to the ejector 2 through the gas pipe L6b is increased. Thus, freezing of moisture contained in the off gas in the ejector 2 is effectively inhibited. The heat conduction member 9a may be sandwiched between the heater 8 according to the seventh example or the end plate 100a according to the eighth example, and the gas pipe L6b.

In this example, the gas pipe L6b and the cooling pipe L1b may include a structure in which heat exchange is performed between the coolant and the fuel gas.

Figure 12:
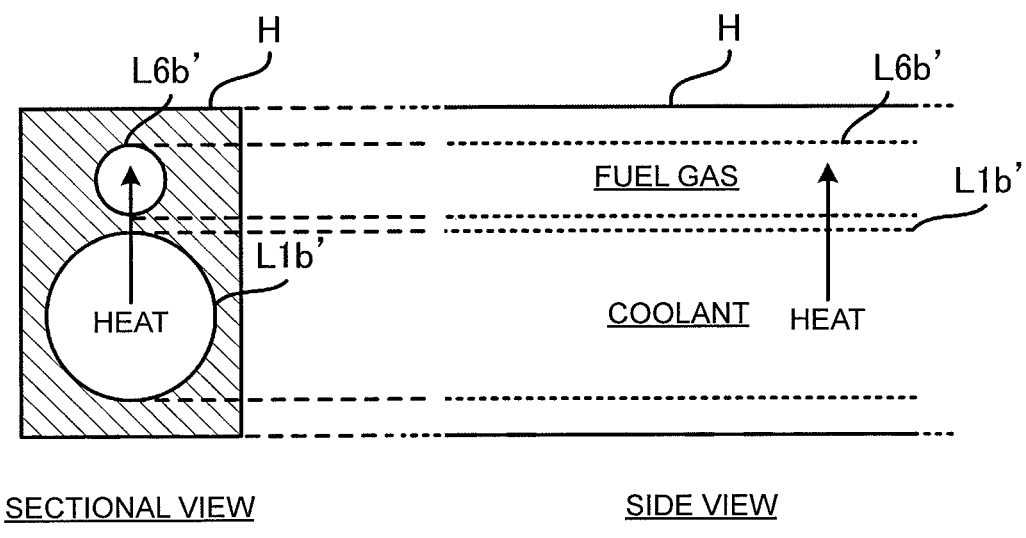
FIG. 12 is a view of an example of a gas pipe and a cooling pipe provided with a structure in which heat exchange is performed.

FIG. 12 is a view of an example of a gas pipe L6b' and a cooling pipe L1b' provided with a structure in which a heat exchange is performed. FIG. 12 shows sections of the gas pipe L6b' and the cooling pipe L1b', the section being orthogonal to a direction in which the fuel gas and the coolant flow. FIG. 12 also shows side views of the gas pipe L6b' and the cooling pipe L1b' along the direction in which the fuel gas and the coolant flow.

The gas pipe L6b' and the cooling pipe L1b' are formed as through-holes in a common housing H. Heat of the coolant inside the cooling pipe L1b' is conducted to the fuel gas inside the gas pipe L6b' through the housing H. Therefore, the small-diameter nozzle 22 is heated effectively.

A material of the housing H may be, for example, polyamide, but not limited to this. There is no limit to shapes of the housing H, the gas pipe L6b', and the cooling pipe L1b'.

Figure 13:
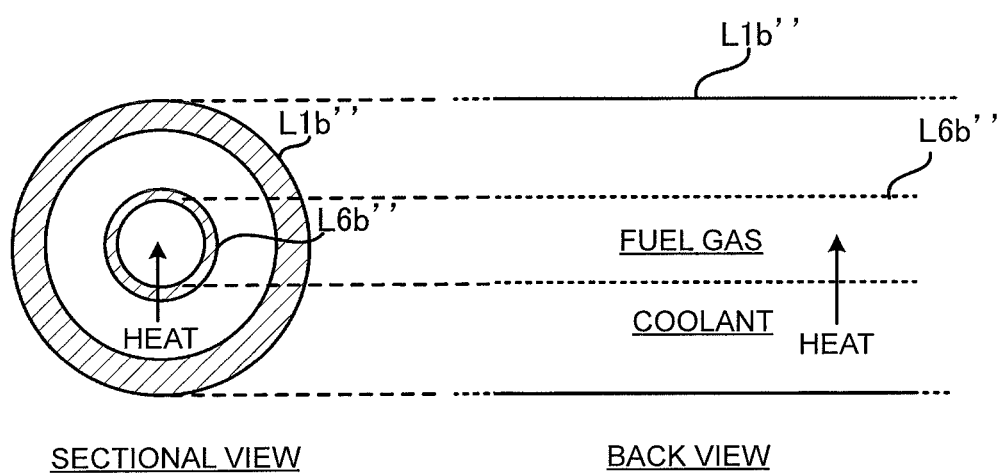
FIG. 13 is a view of another example of the gas pipe and the cooling pipe provided with a structure in which heat exchange is performed.

FIG. 13 is a view of another example of a gas pipe L6b" and a cooling pipe L1b" having a structure in which heat exchange is performed. FIG. 13 shows sections of the gas pipe L6b" and the cooling pipe L1b", the section being orthogonal to a direction in which the fuel gas and the coolant flow. FIG. 13 also shows side views of the gas pipe L6b" and the cooling pipe L1b" along the direction in which the fuel gas and the coolant flow.

The gas pipe L6b" and the cooling pipe L1b" have a double pipe structure. The cooling pipe L1b" has a diameter larger than that of the gas pipe L6b", and houses the gas pipe L6b" inside. The fuel gas flows inside the gas pipe L6b" and the coolant flows inside the cooling pipe L1b" and outside the gas pipe L6b".

Heat of the coolant is conducted to the fuel gas inside the gas pipe L6b". Therefore, the small-diameter nozzle 22 is heated effectively. A material of the gas pipe L6b" and the cooling pipe L1b" may be, for example, polyamide, but not limited to this. Shapes of the gas pipe L6b" and the cooling pipe L1b" are not limited.

The embodiment described above is a preferred example of the disclosure. However, the disclosure is not limited to this, and various deformations may be made without departing from the gist of the disclosure. For example, the ejector 2 may be provided with another nozzle in addition to the large-diameter nozzle 21 and the small-diameter nozzle 22, and, in this case, the heating unit is provided on a side of the nozzle having the smallest diameter of the injection port, or on a side of the nozzle having the second smallest diameter of the injection port, for example.

What is claimed is:

1. A fuel cell system, comprising:
   a fuel cell configured to generate power due to a chemical reaction between fuel gas and oxidant gas;
   an ejector that includes a first nozzle and a second nozzle having injection ports with different diameters, respectively, the injection ports being configured to inject the fuel gas, the ejector being configured to introduce off gas to the fuel cell together with the fuel gas, the off gas being recirculated from the fuel cell; and
   a heating unit configured to heat the ejector, wherein:
   the diameter of the injection port of the second nozzle is smaller than the diameter of the first nozzle; and
   the heating unit is arranged on a side of the second nozzle of the ejector, out of the first nozzle and the second nozzle.

2. The fuel cell system according to claim 1, wherein the heating unit includes one of a pair of end plates, the end plates sandwiching the fuel cell.

3. The fuel cell system according to claim 1, wherein the heating unit includes a cooling pipe in which a cooling medium that cools the fuel cell flows.

4. The fuel cell system according to claim 1, wherein the heating unit includes a heater configured to generate heat as power is supplied to the heater from a battery.

5. The fuel cell system according to claim 1, further comprising a heat conduction member sandwiched between the ejector and the heating unit, wherein the heat conduction member is configured to be deformed in accordance with shapes of the ejector and the heating unit.

6. The fuel cell system according to claim 1, wherein the heating unit is provided along a gas pipe in which the fuel gas flows to the second nozzle.

7. The fuel cell system according to claim 6, further comprising a heat conduction member sandwiched between the gas pipe and the heating unit, wherein the heat conduction member is configured to be deformed in accordance with shapes of the gas pipe and the heating unit.

8. The fuel cell system according to claim 1, wherein:
   the heating unit includes a cooling pipe in which a cooling medium that cools the fuel cell flows;
   the cooling pipe is provided along a gas pipe in which the fuel gas flows to the second nozzle; and
   the gas pipe and the cooling pipe have a structure in which heat exchange is performed between the cooling medium and the fuel gas.

9. The fuel cell system according to claim 1, comprising an auxiliary heating unit configured to heat the ejector with an amount of heat smaller than that of the heating unit, wherein the auxiliary heating unit is arranged on a side of the first nozzle of the ejector out of the first nozzle and the second nozzle.

* * * * *